Patented Jan. 14, 1947

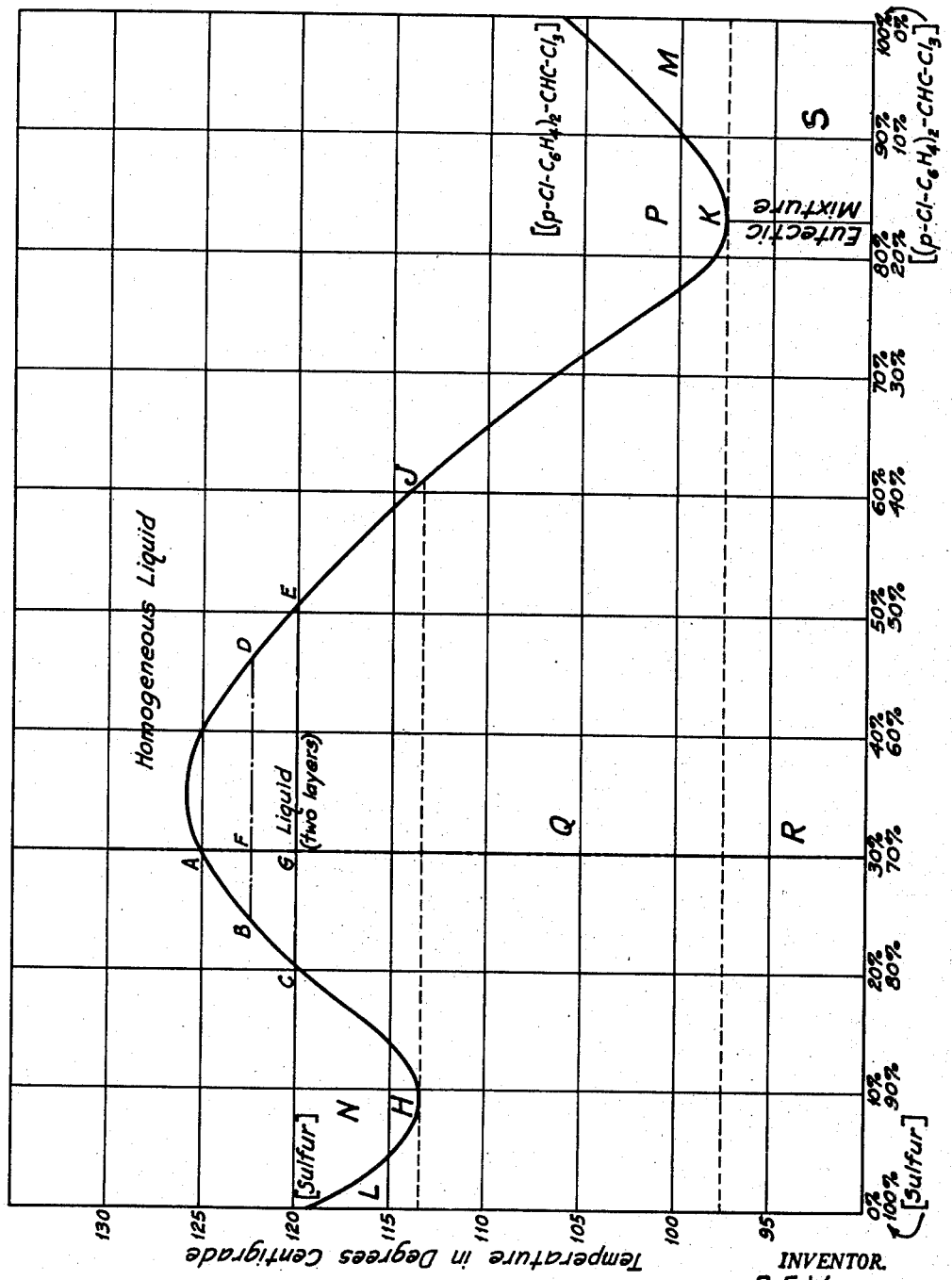

2,414,216

UNITED STATES PATENT OFFICE 2,414,216

FUSED MIXTURE OF SULFUR AND DI(MONO-CHLORPHENYL) TRICHLORETHANE AS AN INSECTICIDE

Robert E. Wean, Plainfield, N. J., and Frank Stanton Charlton, Brooklyn, N. Y., assignors to Stauffer Chemical Company, a corporation of California Application May 8, 1944, Serial No. 534,582

7 Claims. (Cl. 167—20)

This invention relates to improvements in the manufacture of a dusting composition useful against insects and fungi.

An object of this invention is to obtain the advantages of di(para-monochlorophenyl) trichlorethane fused with sulphur as a carrier.

Another object is to effect the dispersion of such a compound in an active carrier. Further objects will become apparent as the invention is explained in the following.

As is well known, no single pest control is effective against all pests. Furthermore, it frequently happens that a combination of pest control materials is far more effective than the sum of the efficacies of the single materials. This can be due to the fact that certain compounds which, while extremely lethal when in contact with an insect pest for a sufficiently long time are not sufficiently rapid in action to immobilize the insects. In combination with other materials possessing a high "knockdown" efficiency, excellent pest control is obtained. Furthermore, even in the absence of any synergistic effect, the range of pests controlled by one application of pest control material is increased.

The insecticidal utility of 2,2-bis(parachlorophenyl), hereinafter termed the agent, and the various known methods by which it can be prepared, are described in the literature and in Re. 22,700. The effectiveness of this against insects and fungi is well recognized. As a pure material it is generally crystalline in nature. However, the crystals are comparatively soft and sticky, and if one attempts to convert them without any carrier into a dust they ball up in the mill. The quantity of material passing through the mill will be small as compared to that which results when only dry, crystalline materials are ground. So far the trichlorethane compound has been used only in combination with inert diluents such as talc and pumice. A carrier is necessary for the dilution of the agent, since the effectiveness of the agent is not increased by using it in concentrations above approximately 5%. We have found that it is possible to combine the agent with sulphur and that such combinations possess efficacies in excess of those of the individual materials. Furthermore, we have found that an excellent method of effecting the combination is to melt a mixture of the agent and the sulphur in the desired proportion and then to cool rapidly in order to prevent separation of the phases.

More particularly, we have found that the trichlorethane compound can be successfully incorporated in dusts by adding a quantity of the agent to molten sulphur, cooling the sulphur until it has solidified, and then grinding the resulting solid mass. Sulphur is miscible in all proportions with the trichlorethane compound above a temperature of 126° C., as appears from the attached drawing which forms a part of the present specification and which shows the phase diagram for mixtures of 0% to 100% sulphur with the complementary quantities of

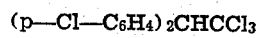

Referring to the phase diagram shown on the accompanying drawing, it will be observed that a eutectic is formed, containing about 17% sulphur.

On cooling a fused mixture. the composition of which is in the range of 39% sulphur to 91% sulphur, the mass separates into two immiscible liquid layers, both of which are solutions of the trichlorethane compound in molten sulphur. For example, referring to the drawing, note that a vertical line has been drawn at the 30–70 composition, intersecting the phase curve at point A. If a solution of this composition is cooled to 125° C. it begins to separate into two liquid phases. If it is cooled to 122½° C., as indicated by the point F, the two liquid phases then have the compositions represented by the points B and D. When cooled to 120° C., the two liquid phases have the compositions C and E. These compositions change continuously due to the fact that the solubility of each phase in the other decreases as the temperature is lowered. When the temperature of the line HJ is reached, pure sulphur begins to separate from the phase which has the composition represented by H and more of the phase represented by J is thereby formed until all of the liquid which remains has the composition represented by J. The temperature then begins to fall and more sulphur is precipitated from the liquid, the composition of which follows the curve from J until the point K is reached. Here the temperature remains constant while the eutectic composition precipitates out, until the mass becomes completely solid.

The cooling curve of a 30% sulphur composition will actually show portions with different cooling rates corresponding to the initial cooling until the curve is reached, the separation of sulphur until all the liquid is of the composition J, the separation of sulphur until K is reached and the precipitation of the eutectic composition. The fact that two different solids can form from the mass is not detrimental because the final solid mass can be readily ground with ease to provide a finely divided uniform product.

If a composition with a sulphur content greater than 91% is melted and then cooled until it reaches the curve, pure sulphur precipitates and the liquid phase becomes richer in di(parachlorphenyl)-trichlorethane until the point H is reached, whereupon more sulphur is precipitated with the formation of liquid of composition J. This continues until no more of the phase of composition H remains and the subsequent behavior of the phase at J is exactly as in the case described above.

If a composition with a sulphur content less than 17% is melted and then cooled, pure di(parachlorphenyl) trichlorethane precipitates out until the composition of the liquid phase reaches that represented by the point K, whereupon the behavior of the phase is again as in the first case.

Thus the regions N and P represent liquid phases, L and Q represent regions where pure sulphur is precipitated from the liquid phase, M represents a region where di(parachlorphenyl)-trichlorethane is precipitated from the liquid phase, R represents sulphur plus the eutectic mixture, S represents di(parachlorphenyl) trichlorethane plus the eutectic mixture, and the region bounded by HAJ and HJ represents the coexistence of two liquid phases.

The presence of impurities in the di(parachlorphenyl)-trichlorethane will alter the phase diagram somewhat but, in general, no more than an equal amount of sulphur need be added to the di(parachlorphenyl) trichlorethane to effect good grindability.

We have found that the improvement in grinding of the agent is attained by mixing the two materials, the trichlorethane compound and sulphur, melting and then cooling the mixture to form a solid mass. Since sulphur is effective in its own right we prefer to add only a small quantity of the agent to a larger quantity of sulphur. For example, 98 parts by weight of sulphur were heated until the sulphur liquefied. Two parts of di(paramonochlorphenyl) trichlorethane were then stirred into the molten sulphur to form a homogeneous solution. The mass was then cooled and, when it had solidified ground. The mass ground with the ease of ordinary sulphur. When employed as a dust it was lethal to the larvae of the Mexican bean beetle (*Epilachna varivestis*) and against adults of the milkweed bug (*Oncopeltus fasciatus*).

In some cases it is desirable to add only sufficient sulphur to impart the desired improved grinding characteristics in the solidified mass. The resulting material can then be mixed with additional finely divided sulphur or with another active carrier or an inert carrier such as talc to provide the desired concentration of the agent or sulphur or of both. For example, in one case the quantity of trichlorethane compound incorporated in the sulphur was increased to a point whereat the final mixture contained only about 20% sulphur. The resulting solid ground readily in a mill, another carrier or more sulphur being added. For example, 20 parts of sulphur were melted and 80 parts of the aforementioned trichlorethane compound added, the mixture being stirred to provide a uniform mass. After cooling, a portion of the mixture was ground, together with sufficient talc to provide a dusting composition containing 2% of the trichlorethane compounds. Another portion was ground with added sulphur to provide a dust containing 2% of the trichlorethane compound.

However, there are certain advantages in preparing the mixture near the eutectic point. In the first place the heat required to melt the mixture is a minimum. In the second place sufficient sulphur is present to impart good grindability to the composition. In the third place the amount of sulphur present is not greatly in excess of that necessary to impart good grindability. It is undesirable to have a large excess of sulphur present in the mixture to be melted since excess heat is required.

In many cases, addition of a small quantity of a suitable sulphur conditioning agent is advantageous. The use of these materials, rosin, magnesium carbonate, lampblack, various calcium phosphates and others, and their compounding is well known in the art. Also, if a sprayable composition is desired one can add a suitable wetting agent, as is disclosed in the Missbach Patent 2,156,790; the final composition is then applied with water.

The use of sulphur as a carrier for the compound is preferred because the mixture possesses physical, insecticidal and fungicidal properties which neither the sulphur nor the trichlorethane compound possesses alone.

The quantity of sulphur and the agent present in the final mass should each be at least sufficient to be effective against insects. More can be used of either but this may be uneconomic for the excess then acts as a diluent or carrier. However, sulphur is not too expensive and its use in this way is not out of the question for it is commonly applied as a dust directly and without dilution.

A dust made up of sulphur and agent alone can contain between about 10% to about 99.5% of the sulphur with the balance agent. If an inert carrier is present the concentration of sulphur and agent should be such that each is effective although one can use less of each when they are used together than when they are used separately. In this case something of the order of 10% of the sulphur and 2% of the agent suffice with balance inert although the sulphur quantity can be increased and the inert decreased.

We claim:

1. The method of manufacturing a dust effective against insects comprising fusing sulphur and a quantity of di(monochlorphenyl) trichlorethane, the fused mass containing between about 20% and about 99.5% of sulphur, cooling the resulting mass until it is solid and then grinding the solid.

2. The method of manufacturing a dust effective against insects comprising fusing sulphur and a quantity of di(p-monochlorphenyl) trichlorethane, the fused mass containing between about 20% and about 99.5% of sulphur, cooling the resulting mass until it is solid and then grinding the solid.

3. The method of manufacturing a dust effective against insects comprising fusing sulphur and a quantity of di(monochlorphenyl) trichlorethane, the fused mass containing between about 20% and about 99.5% of sulphur, cooling the resulting mass until it is solid and then grinding the solid together with an additional solid insecticide carrier to provide a finely divided mass containing an insecticidally effective concentration of sulphur and of said trichlorethane compound.

4. The method of manufacturing a dust effective against insects comprising fusing sulphur and a quantity of di(p-monochlorphenyl) trichlorethane, the fused mass containing between about 20% and 99.5% of sulphur, cooling the resulting mass until it is solid and then grinding the solid together with an additional solid insecticide carrier to provide a finely divided mass containing an insecticidally effective concentration of sulphur and of said trichlorethane compound.

5. The method of manufacturing a dust effective against insects comprising fusing sulphur and a quantity of di(monochlorphenyl)trichlorethane, the fused mass containing between about 20% and about 99.5% of sulphur, cooling the resulting mass until it is solid and then grinding the solid, and incorporating the ground solid into a finely divided carrier to provide a composition containing an insecticidally effective concentration of the sulphur and of the trichlorethane compound.

6. The method of manufacturing a dust effective against insects comprising fusing sulphur and a quantity of di(p-monochlorphenyl)trichlorethane, the fused mass containing between about 20% and about 99.5% of sulphur, cooling the resulting mass until it is solid and then grinding the solid, and incorporating the ground solid into a finely divided carrier to provide a composition containing an insecticidally effective concentration of the sulphur and of the trichlorethane compound.

7. An insecticide containing as an essential active ingredient a composition consisting essentially of sulphur and 2,2-bis(p-chlorophenyl)-1,1,1-trichlorethane and sulphur prepared by fusing sulphur and 2,2-bis(p-chlorophenyl)-1,1,1,-trichlorethane to form a substantially uniform liquid mass of sulphur and 2,2-bis(p-chlorophenyl)-1,1,1-trichlorethane, cooling the mass until it is solid and then comminuting the solid mass to provide a substantially finely divided product in which the 2,2-bis(p-chlorophenyl)-1,1,1-trichlorethane is substantially uniformly distributed throughout the sulphur, the 2,2-bis-(p-chlorophenyl)-1,1,1-trichlorethane constituting between about 0.5% and about 5% of the composition by weight and sulphur the balance of the composition.

ROBERT E. WEAN.
FRANK STANTON CHARLTON.